United States Patent
Hoshida et al.

(10) Patent No.: US 7,271,213 B2
(45) Date of Patent: Sep. 18, 2007

(54) PIGMENT DISPERSING RESIN

(75) Inventors: Yuko Hoshida, Hiratsuka (JP);
Yoshiyuki Yukawa, Hiratsuka (JP);
Isao Kamimori, Hiratsuka (JP);
Akihiko Yamanouchi, Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 121 days.

(21) Appl. No.: 11/168,539

(22) Filed: Jun. 29, 2005

(65) Prior Publication Data

US 2005/0252418 A1    Nov. 17, 2005

Related U.S. Application Data

(62) Division of application No. 10/116,104, filed on Apr. 5, 2002, now Pat. No. 6,994,745.

(30) Foreign Application Priority Data

Apr. 5, 2001    (JP)    ............... 2001-106664

(51) Int. Cl.
*C08L 39/00* (2006.01)
*C08L 33/02* (2006.01)
*C08L 33/14* (2006.01)
*C08L 71/02* (2006.01)
*C08D 11/10* (2006.01)

(52) U.S. Cl. .............. 524/555; 524/556; 524/558; 524/612; 523/160

(58) Field of Classification Search ............. 106/31.85, 106/31.6, 31.25; 524/555, 556, 558, 612; 523/160, 161; 526/287, 310, 317.1, 307.5, 526/332.258

See application file for complete search history.

(56) References Cited

U.S. PATENT DOCUMENTS

| | | | |
|---|---|---|---|
| 5,231,131 A | 7/1993 | Chu et al. | |
| 5,239,028 A | 8/1993 | Nakagawa et al. | |
| 5,349,036 A | 9/1994 | Simpson et al. | |
| 5,494,885 A | 2/1996 | Kudo et al. | |
| 5,610,000 A | 3/1997 | Vishwakarma et al. | |
| 5,674,934 A | 10/1997 | Schmidt et al. | |
| 5,698,628 A | 12/1997 | Masuda et al. | |
| 5,736,606 A | 4/1998 | Yanagi et al. | |
| 5,910,532 A * | 6/1999 | Schmidt et al. ............. | 524/556 |
| 6,248,828 B1 | 6/2001 | Yanauchi et al. | |
| 6,414,100 B1 | 7/2002 | Daimon et al. | |
| 6,439,708 B1 | 8/2002 | Kato et al. | |
| 6,696,515 B2 | 2/2004 | Yamaya et al. | |
| 6,713,551 B2 | 3/2004 | Takahashi et al. | |
| 2003/0069329 A1 | 4/2003 | Kubota et al. | |

FOREIGN PATENT DOCUMENTS

| | | |
|---|---|---|
| DE | 196 54 752 | 7/1997 |
| EP | 372546 | 6/1990 |
| EP | 567214 | 10/1993 |
| EP | 0 732 346 | 9/1996 |
| EP | 798320 | 10/1997 |
| EP | 1 040 935 | 10/2000 |
| EP | 1040935 A1 * | 10/2000 |
| GB | 2322863 | 3/1998 |
| JP | 50-154328 | 12/1975 |
| JP | 1-182304 | 7/1989 |
| JP | 3-239709 | 10/1991 |
| JP | 7-90218 | 4/1995 |
| JP | 7-252395 | 10/1995 |
| JP | 7-316240 | 12/1995 |
| JP | 9-78056 | 3/1997 |
| JP | 9-255728 | 9/1997 |
| JP | 9-267034 | 10/1997 |
| JP | 9-272721 | 10/1997 |
| JP | 10-30010 | 2/1998 |
| JP | 10-139999 | 5/1998 |
| JP | 11-130999 | 5/1999 |
| JP | 11-197485 | 7/1999 |
| JP | 11-228897 | 8/1999 |
| JP | 2000-7734 | 1/2000 |
| JP | 2000-95992 | 4/2000 |
| JP | 2000-204281 | 7/2000 |
| JP | 2000-336292 | 12/2000 |

* cited by examiner

*Primary Examiner*—David W. Wu
*Assistant Examiner*—M. Bernshteyn
(74) *Attorney, Agent, or Firm*—Wenderoth, Lind & Ponack, L.L.P.

(57) ABSTRACT

This invention provides both a pigment dispersing resin which is a copolymer of:

(A) polymerizable unsaturated monomer containing at least one kind of ionic functional group selected from the group consisting of tertiary amino group, quaternary ammonium salt and sulfonic acid group;
(B) nonionic polymerizable unsaturated monomer having polyoxyalkylene chain;
(C) ultraviolet-absorbing polymerizable unsaturated monomer and/or an ultraviolet-stabilizing polymerizable unsaturated monomer; and
(D) other ethylenically unsaturated monomer, and water-based pigment dispersion which comprises said pigment dispersing resin, pigment, aqueous medium and, as circumstances may demand, dispersing agent as well.

21 Claims, No Drawings

PIGMENT DISPERSING RESIN

This is a divisional of Ser. No. 10/116,104, filed Apr. 5, 2002 now U.S. Pat. No. 6,994,745.

This invention relates to a pigment dispersing resin which is suitably used for water-based ink or water-based paint, and to aqueous pigment dispersions containing said pigment dispersing resin which are especially suitable as ink-jet ink for outdoor use.

Ink-jet type printer has widely been used as a printing device for computer According to color tone of each picture element of image data which are stored in memory unit of computer, this ink-jet printer emits ink of four colors, i.e., three primary colors of red, blue and yellow plus black color, from each individual nozzle. These colors of ink are thus adhered as dots to printing paper, and superposed thereon to reproduce the color tone of each picture element. Furthermore, nozzle is driven from side to side while printing paper is driven vertically, and, thus, image data are converted into drawings on printing paper.

Ink-jet type printing has recently been applied not only to printing paper but also to building wall, outdoor signboard, road sign, etc., and, accordingly, ink-jet ink to be used has been required to improve in water resistance, weatherability and light resistance.

For this reason, pigment is now being substituting for dye as a color material for ink-jet ink. However, water-based pigment ink is still unsatisfactory in the print density of printed image. Besides, pigment has a problem that, owing to its insufficient dispersion stability, clogging occurs in head when it is used for ink-jet ink. Hence, there are demands for improvement in pigment wettability and pigment dispersion stability.

Low viscosity and low molecular weight of pigment dispersing resin are considered advantageous for wetting property of pigment; and easy formation of steric repelling layer on the pigment surfaces or good solubility of the pigment dispersing resin in the continuous phase (aqueous medium) are considered advantageous for the dispersing stability. Both the pigment-wetting property and the dispersing stability of the pigment dispersing resin are considered to participate in wetting of the pigment surface with the pigment dispersing resin (a resin having a group capable of forming weak flocculation in aqueous system such as alkyl-group is effective) and in adsorption onto the pigment, which are attributable to the interaction between hydrophobic part on the pigment surface and that of pigment dispersing resin.

Past development of pigment dispersing resins or assistant for water-based paint or water-based ink has been advanced based on the foregoing viewpoints. For instance, JP 50 (1975)-154328 A proposed use of a straight chain anionic polymer containing acidic functional groups which is obtained through polymerization of a monomer mixture containing as a part of its monomer components an acidic functional group-containing, polymerizable unsaturated monomer such as (meth)acrylic acid, as the pigment dispersing resin. Said polymer, however, exhibits high solubility in aqueous media and hence is unsatisfactory in respect of dispersion stability of pigment dispersions. Furthermore, pigment dispersions formed with the use of said polymer show excessively high viscosity and are subject to a drawback of difficult handling.

JP 1 (1989)-182304 A, JP 7 (1995)-316240 A and JP 10 (1998)-502097 A disclosed, as the pigment dispersing resin, a graft copolymer obtained through copolymerization of carboxyl-containing macromonomers. Said graft copolymer excels in pigment dispersing stability because its trunk portion is hydrophobic and the branch portion is hydrophilic whereas pigment dispersions formed with the use of said copolymer show high viscosity, and the graft copolymer is far from being satisfactory in view of the increasing demand for pigment dispersions having high pigment concentration to save cost and to reduce VOC.

JP 9 (1997)-255728 A, JP 9 (1997)-267034 A and JP 8 (1996)-19201 B disclose an idea of using, as pigment dispersing agent, a nonionic surfactant having polyoxyalkylene chain. Although capable of existing stably in water-based pigment dispersions, said surfactant is unsatisfactory in adsorption to pigment, and is in particular poor in let-down stability, and, moreover, inferior in the appearance of resultant coating film.

An object of the present invention is to provide pigment dispersing resins which excel in wetting property and dispersing stability even at high pigment concentration, and which can provide aqueous pigment dispersions having low viscosity, excellent in color developing property and giving a coating film with good appearance.

A further object of the present invention is to provide a water-based pigment dispersion which has low viscosity and which excels in color-developing property.

Another object of the invention is to provide a water-based ink composition which excels in sharpness, transparency, color-developing property and weatherability.

Another object of the invention is to provide a water-based paint which excels in curability and which is capable of forming a painted film of splendid finish appearance in sharpness, transparency, color-developing property and weatherability.

Other objects and characteristics of the invention will become apparent from the following descriptions.

After assiduous study to achieve the above-mentioned objectives, the inventors of this invention have found out that a pigment dispersing resin which is obtained by copolymerizing a monomer having hydrophilic functional group which is a certain kind of ionic group, a nonionic hydrophilic monomer having polyoxyethylene chain and the like, an ultraviolet absorbing- or ultraviolet stabilizing-monomer and other ethylenically unsaturated monomers in the presence of radical polymerization initiator is quite suitable as a pigment dispersing resin for water-based ink or water-based paint.

This invention provides a pigment dispersing resin which is a copolymer of:

(A) polymerizable unsaturated monomer containing at least one kind of ionic functional group selected from the group consisting of tertiary amino group, quaternary ammonium salt and sulfonic acid group;

(B) nonionic polymerizable unsaturated monomer having polyoxyalkylene chain;

(C) ultraviolet-absorbing polymerizable unsaturated monomer and/or an ultraviolet-stabilizing polymerizable unsaturated monomer; and (D) other ethylenically unsaturated monomer.

This invention also provides an aqueous pigment dispersion which comprises the above-mentioned pigment dispersing resin, pigment, aqueous medium and, if necessary, dispersion adjuvant as well.

This invention further provides a water-based ink composition and a water-based paint composition each of which comprises the above-mentioned aqueous pigment dispersion.

The following is a further detailed explanation about pigment dispersing resin, aqueous pigment dispersion, water-based ink composition and water-based paint composition of this invention.

Pigment Dispersing Resin

The pigment dispersing resin which is provided by this invention is a copolymer of (A) an ionic functional group-containing polymerizable unsaturated monomer, (B) a non-ionic polymerizable unsaturated monomer, (C) an ultraviolet-absorbing or ultraviolet-stabilizing polymerizable unsaturated monomer, and (D) other ethylenically unsaturated monomer, as follows.

Ionic Functional Group-containing Polymerizable Unsaturated Monomer (A)

Monomer (A) is a monomeric component by which to introduce a specific ionic functional group into a pigment dispersing resin. For this monomer (A), there is employed a polymerizable unsaturated monomer having at least one kind of ionic functional group which is selected from tertiary amino group, quaternary ammonium salt and sulfonic acid group.

Specific examples of monomer (A) include tertiary amino group-containing polymerizable unsaturated monomer like:

N,N-dialkylaminoalkyl(meth)acrylates such as N,N-dimethylaminoethyl (meth)acrylate, N,N-diethylaminoethyl (meth)acrylate, N,N-dimethylaminopropyl (meth)acrylate, N,N-di-t-butylaminoethyl (meth)acrylate and N,N-dimethylaminobutyl (meth)acrylate; and N,N-dialkylaminoalkyl (meth)acrylamides such as N,N-dimethylaminoethyl (meth)acrylamide, N,N-diethylaminoethyl (meth)acrylamide and N,N-dimethylaminopropyl (meth)acrylamide;

quaternary ammonium salt group-containing polymerizable unsaturated monomers like: (meth)acryloyloxyalkyl trialkylammonium salts such as 2-(methacryloyloxy)ethyl trimethylammonium chloride, 2-(methacryloyloxy)ethyl trimethylammonium bromide and 2-(methacryloyloxy)ethyl trimethylammonium dimethylphosphate;

(meth)acryloylaminoalkyltrialkyl ammonium salts such as (meth)acryloylaminopropyl trimethylammonium chloride and (meth)acryloylaminopropyl trimethylammonium bromide;

tetraalkyl(meth)acrylate such as tetrabutylammonium(meth)acrylate; and trialkylbenzylammonium (meth)acrylate such as trimethylbenzylammonium (meth)acrylate;

and sulfonic acid group-containing polymerizable unsaturated monomers like: (meth)acrylamide-alkanesulfonic acid such as 2-acrylamide-2-methylpropanesulfonic acid; and sulfoalkyl(meth)acrylate such as 2-sulfoethyl(meth)acrylate. These monomers may be used either singly or in combination of two or more. Among the above-mentioned monomers, N,N-dimethylaminoethyl (meth)acrylate, N,N-diethylaminoethyl (meth)acrylate, 2-(methacryloyloxy)ethyltrimethylammonium chloride and 2-acrylamide-2-methylpropanesulfonic acid are particularly suitable as polymerizable unsaturated monomer (A).

When quaternary ammonium salt-containing polymerizable unsaturated monomer is used together with tertiary amino group-containing polymerizable unsaturated monomer, in particular when 2-(methacryloyloxy)ethyltrimethylammonium chloride is used together with N,N-dimethylaminoethyl (meth)acrylate and/or N,N-diethylaminoethyl (meth)acrylate, there can be broaden the range of pigment to which the pigment dispersing resin of this invention is applicable.

In the case of said combined use, the weight ratio of (a) quaternary ammonium salt-containing polymerizable unsaturated monomer to (b) tertiary amino group-containing polymerizable unsaturated monomer is usually in a range of 10/1 to 1/20, especially 5/1 to 1/10.

When tertiary amino group-containing polymerizable unsaturated monomer and/or quaternary ammonium salt-containing polymerizable unsaturated monomer are used as monomer (A), tertiary amino group and/or quaternary ammonium salt which are introduced into resin act effectively especially for the sake of dispersibility of acidic pigment or neutral pigment. When, on the other hand, sulfonic acid group-containing polymerizable unsaturated monomer is used as monomer (A), sulfonic group which is introduced into resin acts effectively especially for the sake of dispersibility of basic pigment.

Nonionic Polymerizable Unsaturated Monomer (B) Containing Polyoxyalkylene Chain

Monomer (B) is a monomeric component which gives hydrophilicity to the formed copolymer, and which contains polyoxyalkylene chain and polymerizable unsaturated monomer in molecule. Examples of said polyoxyalkylene chain include polyoxyethylene chain, polyoxypropylene chain and polyoxyethylene-polyoxypropylene block chain.

Polyoxyalkylene chain has preferably a molecular weight in a range of 200 to 3,000, in particular 300 to 2,500.

Typical example of monomer (B) is represented by compounds of the following formula (1):

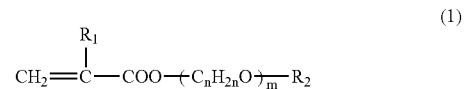

(1)

in which
R$_1$ stands for hydrogen or CH$_3$,
R$_2$ stands for hydrogen or C$_1$ to C$_4$ alkyl group,
m is an integer of 4-60, in particular 6-50, and
n is an integer of 2-3, preferably 2, and
oxyalkylene units (C$_n$H$_{2n}$O) in the number of m may be the same or different from each other.

Specific examples of such monomer (B) are as follows: tetraethylene glycol (meth)acrylate, methoxytetraethylene glycol(meth)acrylate, ethoxytetraethylene glycol (meth)acrylate, n-butoxytetraethylene glycol (meth)acrylate, tetrapropylene glycol (meth)acrylate, methoxytetrapropylene glycol (meth)acrylate, ethoxytetrapropylene glycol (meth)acrylate, n-butoxytetrapropylene glycol (meth)acrylate, polyethylene glycol (meth)acrylate, polypropylene glycol (meth)acrylate, methoxypolyethylene glycol (meth)acrylate and ethoxypolyethylene glycol (meth)acrylate, among which polyethylene glycol (meth)acrylate and polypropylene glycol (meth)acrylate are particularly suitable.

These monomers may be used either singly or in combination of two or more.

Ultraviolet-absorbing Polymerizable Unsaturated Monomer and/or Ultraviolet-stable Polymerizable Unsaturated Monomer (C)

Monomer (C) is a monomeric component which gives ultraviolet-absorbability and/or ultraviolet-stability to copolymer and thereby improves the weatherability of copolymer.

As ultraviolet-absorbing polymerizable unsaturated monomer which is used for such a purpose, there are mentioned products of addition reaction between hydroxybenzophenones such as 2,4-dihydroxybenzophenone and 2,2',4-trihydroxybenzophenone and glycidyl(meth)acrylate, examples of which include 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloxy-2-hydroxypropoxy)benzophenone; or 2-(2'-hydroxy-5'-methacryloyloxyethylphenyl)-2H-benzotriazole, among which those having both (2'-hydroxyphenyl)-benzotriazole structure and (meth)acryloyl group, concretely the above-mentioned 2-(2'-hydroxy-5'-methacryloyloxyethylphenyl)-2H-benzotriazole, are preferable.

Examples of ultraviolet-stable polymerizable unsaturated monomer include 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine and 1-crotonoyl-4-crotonoyloxy-2,2,6,6-tetramethylpiperidine, among which 4-(meth)acryloyloxy-1,2,2,6,6-pentamethylpiperidine is preferable.

These ultraviolet-absorbing polymerizable unsaturated monomer and ultraviolet-stable polymerizable unsaturated monomer are appropriately chosen depending on pigment to be dispersed, and may be used either singly (only ultraviolet-absorbing polymerizable unsaturated monomer or only ultraviolet-stable polymerizable unsaturated monomer) or in combination (of ultraviolet-absorbing polymerizable unsaturated monomer and ultraviolet-stable polymerizable unsaturated monomer).

Other Ethylenically Unsaturated Monomer (D)

Other ethylenically unsaturated monomer (D) is a polymerizable unsaturated monomer other than the above monomers (A), (B) and (C) which is copolymerizable with said monomers (A), (B) and (C), and is suitably selected according to property(ies) required of pigment dispersing resins.

Concrete examples of such monomer (D) include $C_1$ to $C_{24}$ straight chain- or cyclic-alkyl (meth)acrylate monomer such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, 2-ethylhexyl (meth)acrylate, n-octyl (meth)acrylate, lauryl (meth)acrylate, stearyl (meth)acrylate, cyclohexyl (meth)acrylate, isobornyl (meth)acrylate and tridecyl (meth)acrylate; hydroxyl group-containing polymerizable unsaturated monomer (typically hydroxyalkyl (meth)acrylate monomer) such as 2-hydroxyethyl (meth)acrylate, hydroxypropyl (meth)acrylate and hydroxybutyl (meth)acrylate; carboxyl group-containing polymerizable unsaturated monomer such as methacrylic acid and acrylic acid; acrylamide and (meth)acrylamide; oxetane ring-containing (meth)acrylates such as 3-ethyl-3-(meth)acryloyloxymethyl oxetane, 3-methyl-3-(meth)acryloyloxymethyl oxetane and 3-butyl-3-(meth)acryloyloxymethyl oxetane; aromatic vinyl compounds such as styrene, α-methyl styrene and vinyl toluene; (meth)acrylonitrile; and vinyl acetate. These polymerizable unsaturated monomers may be used either singly or in combination of two or more.

When used, for example, for the preparation of colored water-based base coating paints, the pigment dispersing resins offered by the present invention desirably react with curing agent component, e.g., amino resins or optionally-blocked polyisocyanate compounds, to be incorporated into the cross-linked paint film, for the sake of favorable paint film performance. Therefore, monomer (D) desirably contains a hydroxyl group-containing polymerizable unsaturated monomer at least as a part of its component.

When used for water-based ink, monomer (D) desirably contains a hydroxyl group-containing polymerizable unsaturated monomer at least as a part of its component from a viewpoint of wettability to printed surface, spreadability of ink and reactivity with the above-mentioned curing agent component, and the like.

Specific examples of such hydroxyl group-containing polymerizable unsaturated monomer include monoesters between polyhydric alcohols and (meth)acrylic acid such as 2-hydroxyethyl (meth)acrylate, hydroxypropyl (meth)acrylate, 2,3-dihydroxybutyl (meth)acrylate, 4-hydroxybutyl (meth)acrylate, polyethylene glycol mono(meth)acrylate and the like; and compounds formed by ring-opening polymerization of said monoesters of polyhydric alcohols and (meth)acrylic acid, with ε-caprolactone. In particular, 4-hydroxybutyl (meth)acrylate, polyethylene glycol mono(meth) acrylate [other than the above-described monomer (B)] and compounds formed by ring-opening polymerization of said monoesters of polyhydric alcohols and acrylic or methacrylic acid, with ε-caprolactone, show favorable reactivity. The above-recited compounds may be used either singly or in combination of two or more.

The use rate of the hydroxyl group-containing polymerizable unsaturated monomers is normally 3-30% by weight, in particular 5-25% by weight, based on the total weight of the monomers (A), (B), (C) and (D).

The pigment dispersing resin of this invention is intended to be used chiefly for aqueous system. With a view to keeping the water dispersibility of said resin, there may be used, in addition to the above-mentioned monomer (B), carboxyl group-containing polymerizable unsaturated monomer at least as a part of the above-mentioned other ethylenically unsaturated monomer (D) if necessary. Incidentally, it is desirable that a pigment dispersing resin which is obtained by the use of carboxyl group-containing polymerizable unsaturated monomer should not be used together with basic neutralizer.

Pigment Dispersing Resin

The pigment dispersing resin of this invention is produced by the copolymerization of ionic functional group-containing polymerizable unsaturated monomer (A), nonionic polymerizable unsaturated monomer (B), ultraviolet absorbing- or ultraviolet stable-polymerizable unsaturated monomer (C) and other ethylenically unsaturated monomer (D). The proportion of monomers (A), (B), (C) and (D) in copolymerization is not strictly restricted, but may be varied depending on the physical property required of formed copolymer, and the like. Generally, however, the proportion may be set in the following range on the basis of the total weight of monomers (A), (B), (C) and (D):

Monomer (A): 0.5 to 30% by weight, preferably 1 to 20% by weight, much more desirably 1.5 to 15% by weight;

Monomer (B): 5 to 40% by weight, preferably 10 to 30% by weight, much more desirably 15 to 25% by weight;

Monomer (C): 0.1 to 5% by weight, preferably 0.5 to 3% by weight, much more desirably 1 to 2.5% by weight;

Monomer (D): 25 to 94.4% by weight, preferably 47 to 88.5% by weight, much more desirably 57.5 to 82.5% by weight.

The copolymerization of monomers may be conducted by any known method, for instance, by solution polymerization in an organic solvent, emulsion polymerization in water, or the like, among which solution polymerization is suitable. In an example of copolymerization by solution polymerization, a mixture of the above-mentioned monomers (A), (B), (C) and (D) and a radical polymerization initiator is dissolved or dispersed in an organic solvent, and heated for polymerization at a temperature of about 80° C. to about 200° C. with stirring for 1 to 10 hours.

Examples of organic solvent which is usable for copolymerization include hydrocarbon solvents such as heptane, toluene, xylene, octane and mineral spirit; ester solvents such as ethyl acetate, n-butyl acetate, isobutyl acetate, ethylene glycol monomethylether acetate and diethylene glycol monobutylether acetate; ketone solvents such as methyl ethyl ketone, methyl isobutyl ketone, diisobutyl ketone and cyclohexanone; alcohol solvents such as methanol, ethanol, isopropanol n-butanol sec-butanol and isobutanol; ether solvents such as n-butyl ether, dioxane, ethylene glycol monomethyl ether and ethylene glycol monoethyl ether and the like; and aromatic petroleum solvents such as Swasol™ 310, Swasol™ 1000 and Swasol™ 1500 of Cosmo Oil Co., Ltd. These organic solvents can be used either singly or in combination of two or more. At the time of (co-)polymerization, the organic solvent is normally used in an amount not more than 400 parts by weight based on 100 parts by weight of the monomer components to be (co-)polymerized.

Examples of the above-mentioned radical polymerization initiator include organic peroxide polymerization initiators like ketone peroxides such as cyclohexanone peroxide, 3,3,5-trimethylcyclohexanone peroxide and methylcyclohexanone peroxide; peroxyketals such as 1,1-bis(tert-butylperoxy)-3,3,5-trimethylcyclohexane, 1,1-bis(tert-butylperoxy)cyclohexane and n-butyl-4,4-bis(tert-butylperoxy)valerate; hydroperoxides such as cumene hydroperoxide and 2,5-dimethylhexane-2,5-dihydroperoxide; dialkylperoxides such as 1,3-bis(tert-butylperoxy-m-isopropyl)-benzene, 2,5-dimethyl-2,5-di(tert-butylperoxy)hexane, diisopropylbenzene peroxide and tert-butylcumyl peroxide; diacyl peroxides such as decanoyl peroxide, lauroyl peroxide, benzoyl peroxide and 2,4-dichlorobenzoyl peroxide; peroxycarbonates such as bis(tert-butylcyclohexyl)peroxydicarbonate; and peroxy esters such as tert-butylperoxybenzoate and 2,5-dimethyl-2,5-di(benzoylperoxy)-hexane; and azo polymerization initiators like 2,2'-azobisisobutyronitrile, 1,1-azobis(cyclohexane-1-carbonitrile), azocumene-2,2'-azobis-methylvaleronitrile and 4,4'-azobis(4-cyanovalerianic acid). The use rate of these polymerization initiators is not critical. Normally, however, it is desirably within a range of 0.1-15 parts by weight, in particular 0.3-10 parts by weight, per 100 parts by weight of the total of the monomers to be copolymerized.

In the above (co-)polymerization reaction, the method of addition of the monomeric components to be polymerized or the polymerization initiator is not critical. The polymerization initiator is, however, conveniently added dropwise plural times by portions over the time spun from the initial stage of polymerization to the advanced stage, rather than added in a lump sum at the initial stage, for the sake of effective temperature control during the polymerization reaction and of the prevention of undesirable cross-linked product such as gel from formed.

The molecular weight of thus produced copolymer is not in particular restricted. Preferably, however, the weight average molecular weight of copolymer is within a range of 500 to 100,000, in particular 1,000 to 70,000, especially 3,000 to 50,000, from a viewpoint of aqueous dispersion stability, pigment dispersibility, viscosity, VOC and color number (degree of pigmentation).

The pigment dispersing resin of this invention which comprises copolymer produced in the afore-mentioned manner is used for the preparation of water-based pigment dispersion. The pigment dispersion resin is therefore required to have both wettability with regard to pigment and pigment dispersion stability. Monomer (A) component which constitutes the pigment dispersing resin of this invention is capable of improving the adsorption of pigment dispersing resin to pigment, and thus acts advantageously for the improvement both in wettability with regard to pigment and in the dispersion stability of resin. Monomer (B) component which constitutes the pigment dispersing resin of this invention contributes to the improvement of pigment dispersing resin in the solubility in continuous phase (aqueous medium), and acts advantageously in particular for the improvement of pigment dispersing resin in dispersion stability. Monomer (C) component which constitutes the pigment dispersing resin of this invention gives to resin ultraviolet absorbability, ultraviolet stability or radical active seed-trapping effect, and thus contributes to the improvement of weatherability of coating film which is formed from pigment dispersing resin-containing ink or paint. Furthermore, copolymerization with use of tertiary amino group-containing polymerizable unsaturated monomer at least as a part of monomer (A) provides a pigment dispersing resin which has remarkably improved capability to disperse black (carbon black) pigment which is said to be especially difficult to be dispersed.

Hence, the pigment dispersing resin of this invention is quite useful for the preparation of water-based pigment dispersion together with pigment and aqueous medium.

Water-based Pigment Dispersion

The water-based pigment dispersion of this invention can be prepared by blending, with the afore-mentioned pigment dispersing resin of the invention, pigment, aqueous medium and, as circumstances may demand, other pigment dispersing resins, dispersing agent, basic neutralizer and other additives as well.

Examples of pigment include: bright pigments such as aluminum powder, copper powder, nickel powder, stainless steel powder, chromium powder, micaceous iron oxide, titanium dioxide-coated mica powder, iron oxide-coated mica powder and bright graphite; organic red pigments such as Pink EB, azo- and quinacridone-derived pigments; organic blue pigments such as cyanin blue and cyanin green; organic yellow pigments such as benzimidazolone-, isoindolin- and quinophthalone-derived pigments; inorganic colored pigments such as titanium white, titanium yellow, iron red, carbon black, chrome yellow, iron oxide and various calcined pigments. Also extender pigment may be included.

These pigments may be subjected to any known treatment such as acid-base treatment, coupling agent treatment or oxidation/reduction treatment.

Among the above pigments, concrete examples of pigments which are used in particular for ink-jet ink include black pigment like Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080 and Raven 1060 (which are manufactured by Columbian Carbon Co.); Regal400R, Regal330R, Regal660R, Mogul L, Black Pearls L, Monarch 700, Monarch 800, Monarch 880, Monarch 900, Monarch 1000, Monarch 1100, Monarch 1300 and Monarch 1400 (which are manufactured by Cabot Co.); Color Black FW1, Color Black FW2, Color Black FW2V, Color Black 18, Color Black FW200, Color Black S150, Color Black S160, Color Black S170, Printex35, PrintexU, PrintexV, Printex140U, Printex140V, Special Black 6, Special Black 5, Special Black 4A and Special Black 4 (which are manufactured by Degussa Co.); No. 25, No. 33, No. 40, No. 47, No. 52, No. 900, No. 2300, MCF-88, MA600, MA7, MA8 and MA100 (which are manufactured by Mitsubishi Chemical Corporation); cyanic color pigment like C.I. Pigment Blue-1, C.I. Pigment Blue-2, C.I. Pigment Blue-3, C.I. Pigment Blue-15, C.I. Pigment Blue-15:1, C.I. Pigment Blue-15:3, C.I. Pigment Blue-15:34, C.I. Pigment Blue-16, C.I. Pigment Blue-22 and C.I. Pigment Blue-60; magenta color pigment like C.I. Pigment Red-5, C.I. Pigment Red-7, C.I. Pigment Red-12, C.I. Pigment Red-48, C.I. Pigment Red-48:1, C.I. Pigment Red-57, C.I. Pigment Red-112, C.I. Pigment Red-122, C.I. Pigment Red-123, C.I. Pigment Red-146, C.I. Pigment Red-168, C.I. Pigment Red-184 and C.I. Pigment Red-202; and yellow color pigment like C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151 and C.I. Pigment Yellow-154. These are only examples, and not restrictive at all.

Blend ratios of these pigments are not subject to specific limitations. Normally, however, they are within a range of 10-3,000, preferably 15-2,000, inter aha 15-1,500 parts by weight, per 100 parts by weight of a pigment dispersing resin of the present invention in consideration of pigment dispersing ability, dispersion stability and color developing property of resulting pigment dispersions.

Examples of useful aqueous medium include water and water-organic solvent mixtures formed by dissolving organic solvent such as water-soluble organic solvent in water. Useful organic solvent in such mixtures include, for example, water-soluble organic solvents such as methyl alcohol, ethyl alcohol isopropyl alcohol, propylpropylene glycol, butyl cellosolve, propylene glycol monomethyl ether and 3-methyl-3-methoxybutanol; and water-hardly-soluble or water-insoluble organic solvents such as xylene, toluene, cyclohexanone, hexane and pentane. These organic solvents may be used either singly or as a mixture of two or more. Water-insoluble organic solvent may be concurrently used with water-soluble organic solvent, in minor quantities. The mixing ratio of water and organic solvent is not critical. It is desirable, however, that the organic solvent content of the mixture does not exceed 50%, in particular 35%, by weight. The blend ratio of the aqueous medium is not critical. It is desirable, however, that the ratio is within a range of 50-5,000, preferably 100-3,000, inter alia 100-2,000, parts by weight per 100 parts by weight of a pigment dispersing resin or resins of the present invention in respect of viscosity in the occasion of dispersing the pigment, pigment dispersing ability, dispersion stability and production efficiency.

Examples of other pigment dispersing resins which are used where necessary include acryilc resin which is produced by the copolymerization of carboxylic group-containing polymerizable unsaturated monomer such as (meth) acrylic acid with hydroxyl group-containing polymerizable unsaturated monomer such as 2-hydroxyethyl (meth)acrylate and other polymerizable unsaturated monomer in the presence of radical polymerization initiator. Such an acrylic resin preferably has a weight average molecular weight within a range of about 2,000 to 150,000, in particular 5,000 to 100,000, and an acid value in a range of 5 to 150, especially 15 to 100, and a hydroxyl value in a range of 10 to 160, in particular 30 to 120. Other pigment dispersing resins also include polyester resin which is produced by condensation reaction between polyhydric alcohol such as ethylene glycol, butylene glycol, 1,6-hexane diol trimethylol propane and pentaerythritol and polyvalent carboxylic acid component such as adipic acid, isophthalic acid, terephthalic acid, phthalic anhydride, hexahydrophthalic anhydride and trimellitic acid anhydride. Such a polyester resin preferably has a weight average molecular weight within a range of about 1,000 to 100,000, in particular 1,500 to 70,000, and an acid value in a range of 5 to 150, especially 15 to 100, and a hydroxyl value in a range of 10 to 160, in particular 30 to 120.

In the process of production of water-based pigment dispersion of this invention, pigment and pigment dispersing resin of this invention are usually diluted with other pigment dispersing resin after dispersed in aqueous medium. Owing to this dilution, the resultant dispersion has stability as enamel or long-term storage stability, or becomes readily miscible with binder component of ink or paint.

As for the proportion of the pigment dispersing resin (I) of this invention and other pigment dispersing resin (II), resin (II) is suitably used in an amount of 5 to 300 parts by weight, in particular 20 to 150 parts by weight, per 100 parts by weight of resin (I).

As examples of dispersing agent to be used where necessary, Disperbyk™ 184 or 190 (BYK-Chemie Co.) may be named. Other usable additives include anti-foaming agent, antiseptic, rust-proofing agent and plasticizing agent. It is desirable that blend ratio of any of these additives does not exceed 50 parts by weight per 100 parts by weight of the pigment dispersing resin of the present invention in respect of pigment dispersing ability of the resin, stability of the pigment paste, let-down stability or coating film performance.

Examples of the above-mentioned anti-foaming agent include BYK-019, BYK-021, BYK-023, BYK-024, BYK-025, BYK-028 (aqueous silicone type anti-foaming agents manufactured by BYK-Chemie Co.) and BYK-011 (silicone-free polymer type anti-foaming agents manufactured by BYK-Chemie Co.).

When the pigment dispersing resin of this invention and other pigment dispersing resins have carboxyl groups, said basic neutralizer are used to neutralize the carboxyl groups and to make these pigment dispersing resins water-soluble or water-dispersible. Specific examples of such a basic neutralizer include inorganic bases such as ammonium hydroxide, sodium hydroxide and potassium hydroxide; and amines such as aminomethyl propanol, aminoethylpropanol, dimethylethanolamine, triethylamine, diethylethanolamine, dimethylaminopropanol and aminomethylpropanol. The use rate of such a basic neutralizer should be sufficient to render the pigment dispersing resin water-soluble or water-dispersible. Normally, therefore, basic neutralizer is used at a rate sufficient to make the neutralization equivalent of carboxyl group in the pigment dispersing resin 0.3-1.5, preferably 0.4-1.3.

In this invention, no basic neutralizer is desirably used when pigment is to be dispersed with use of the pigment dispersing resin of this invention. If a basic neutralizer is used, pigment adsorbs the basic neutralizer before the pigment dispersing resin of this invention is adsorbed on the pigment, with the result that dispersibility may possibly be damaged. When, on the other hand, pigment is dispersed by the pigment dispersing resin of this invention and is then diluted with other pigment dispersing resins, neutralization with basic neutralizer is desirable.

Water-based pigment dispersions can be formulated by homogeneously mixing and dispersing the above-described constituents with a dispersing machine such as paint shaker, sand grind mill, ball mill, LMZ mill, DCP pearl mill and the like.

Water-based Ink Composition

According to this invention, water-based ink composition can be prepared from the above-mentioned water-based pigment dispersion as it is, or from said water-based pigment dispersion and, added thereto if necessary, additives such as aqueous medium, water soluble resin, thickening agent, fluidity adjustor, film forming assistant, surfactant, pH adjustor, mildew-proofing agent, antioxidant, ultraviolet absorbing agent, ultraviolet stabilizing agent and chelating agent and dye stuffs as well.

As aqueous medium, anyone may be selected for use from those explained above as ones which are usable where necessary for the production of the water-based pigment dispersion of this invention.

As water soluble resin, there may be used, from the viewpoint of ink property control, polyethylene imine, polyamines, polyvinyl pyrrolidone, cellulose derivative, polysaccharides, acrylic emulsion or polyurethane emulsion. Furthermore, there may be contained, as a resin component, curing agent such as amino resin or polyisocyanate compounds which may be blocked.

As amino resins which are used as curing agent, melamine resins are used in general. In particular, methylolmelamine resins and melamine resins whose methylol groups are at least partially etherified with $C_1$-$C_4$ monohydric alcohols are suitable. While it is preferred that they be water-soluble or water-dispersible, water-insoluble ones can also be used.

As commercially available melamine resins useful for the above purpose, the following may be named for example: butyl etherified melamine resins such as U-Van™ 20SE-60 and 225 (Mitsui Chemicals, Inc.), Super Beckamine™ G840 and G821 (Dainippon Ink & Chemicals, Inc.); methyl etherified melamine resins such as Sumimal™ M-100, M-40S and M-55 (Sumitomo Chemical Co., Ltd.), Cymel™ 303, 325, 327, 350 and 370 (Mitsui Cytec Co., Ltd.), Nikalac™ MS17 and MS15 (Sanwa Chemical Co., Ltd.) and Resimine™ 741 (Monsanto Co.); methyl- and iso-butyl-mixed etherified melamine resins such as Cymel™ 235, 202, 238, 254, 272 and 1130 (Mitsui Cytec Co., Ltd.), and Sumimal™ M66B (Sumitomo Chemical Co., Ltd.); and methyl- and n-butyl-mixed etherified melamine resins such as Cymel™ XV805 (Mitsui Cytec Co., Ltd.) and Nikalac™ MS95 (Sanwa chemical Co., Ltd.).

Said optionally-blocked polyisocyanate compounds usable as the curing agent include both of polyisocyanate compounds having free isocyanate groups and those in which isocyanate groups are blocked.

Examples of polyisocyanate compounds having free isocyanate groups include organic polyisocyanates per se, e.g., aliphatic diisocyanates such as hexamethylenediisocyanate and trimethylhexamethylenediisocyanate; cycloaliphatic diisocyanates such as hydrogenated xylylenediisocyanate and isophoronediisocyanate; aromatic diisocyanates such as tolylenediisocyanate and 4,4'-diphenylmethanediisocyanate; and polyisocyanate compounds having not less than 3 isocyanate groups such as triphenylmethane-4,4',4"-triisocyanate, 1,3,5-triisocyanatebenzene, 2,4,6-triisocyanatetoluene and 4,4'-dimethyldiphenylmethane-2,2',5,5'-tetraisocyanate. These organic polyisocyanates may be used in such forms as adducts with polyhydric alcohol, low molecular weight polyester resin, water or the like; or cyclized polymers composed of these organic polyisocyanates, or isocyanate biuret.

As commercially available polyisocyanate compounds having free isocyanate groups, for example, Burnock™ D-750, -800, DN-950, DN-970 and DN-15-455 (Dainippon Ink & Chemicals, Inc.); Desmodur™ L, N, HL and N3390 (Sumitomo Bayer Urethane Co., Ltd.); Takenate™ D-102, -202, -110 and -123N (Takeda Chemical Industries, Ltd.); Coronate™ EH, L, HL and 203 (Nippon Polyurethane Industry Co., Ltd.); and Duranate™ 24A-90CX (Asahi Chemical Industry Co., Ltd.) may be named.

As polyisocyanate compounds in which isocyanate groups are blocked, those formed by blocking isocyanate groups in the above-described polyisocyanate compounds having free isocyanate groups, with a known blocking agent such as oxime, phenol, alcohol lactam, malonic acid ester or mercaptane can be used. Typical commercially available polyisocyanate compounds whose isocyanate groups are blocked include Burnock™ D-550 (Dainippon Ink & Chemicals, Inc.), Takenate™ B-815-N (Takeda Chemical Industries, Ltd.), Additol™ VXL-80 (Hoechst AG, Germany), Coronate™ 2507 (Nippon Polyurethane Industry Co., Ltd.) and Desmodur™ N3500 (Sumitomo Bayer Urethane Co., Ltd.). These curing agents may contain curing catalyst when used.

Examples of ultraviolet absorbing agent include benzophenone type, benzotriazole type, cyanoacrylate type, salicilate type and anilide oxalate type compounds. As an example of ultraviolet stabilizer, there can be mentioned hindered amine type compounds.

Dispersed particles which are contained in the water-based ink composition of this invention have preferably an average particle size in a range of 1 to 300 nm, in particular 1 to 200 nm. The viscosity of ink liquid is preferably within a range of 1.0 to 10 mPa·s, in particular 1.5 to 7 mPa·s.

The water-based ink composition of this invention is in particular suitable as ink-jet ink, and is used for ink-jet drawing by usual ink-jet drawing system. Ink-jet drawing system may be any of piezo ink-jet type, thermal ink-jet type or any other known type. The water-based ink composition of this invention may be applied not only to normal ink-jet drawing device but also to a drawing device which is equipped with heater or the like with which to control ink drying; to a recording device which is equipped with intermediate transfer mechanism by which to print recording material on an intermediate medium and then to transfer the resultant print on recording medium such as paper; and to automatic drawing device by which to directly paint wall, outdoor sign board or automobile body.

Substrate on which the ink composition of this invention is to be applied is not restricted in particular. There may be mentioned base material such as paper, metal or plastics; base material such as mortar or slate; or these base materials which have been subjected to surface treatment and/or coating film formation.

The use of the water-based ink composition of this invention provides an ink-jet print which has good weatherability and which is suitably applied for outdoor use such as building wall, outdoor signboard, road sign and automobile body.

This invention thus provides a method to produce an ink-jet print which characteristically comprises forming, on such a substrate as mentiond above, printed layer (i) by ink-jet method with use of the water-based ink composition of this invention, and then forming thereon a clear coat layer (ii) with use of clear paint.

Printed layer (i) can be formed by the above-mentioned ink-jet drawing system. Designs or letters are usually drawn as desired by use of a head which has nozzles for four colors respectively, i.e., primary colors of red, blue and yellow, plus black.

Thus formed printed layer (i) may be a thin film layer having a thickness, as of dried film, of 0.1 to 10 μm.

Thus formed printed layer (i) is dried to be set to the touch or semi-cured or heat-cured either by drying at normal temperature or by hot air blowing as circumstances may demand, and, on this printed layer (i), there is formed a clear coat layer (ii) with use of clear paint.

As the above-mentioned clear paint, there may be used any paint such as organic solvent type, aqueous type or powder type paint without restriction so long as it has good weatherability. Examples of resin which is used for said paint include resins of various types such as acrylic resin, polyester resin, alkyd resin, silicone resin and fluoroplastics. If necessary, there may be used, together with said resins, a crosslinking agent such as polyisocyanate compound, amino resin, epoxy group-containing compound and carboxyl group-containing compound. These paints may be either of cold-setting type or of thermo-setting type, or may be those which are cured by active ray such as ultraviolet ray or electron rays. Especially preferable are clear paints of urethane curing type formed from acryl- or polyester-polyol and polyisocyanate compound, or a clear paint which is based on acrylic resin of ultraviolet-curing type. Clear paint desirably contains ultraviolet absorbing agent and/or ultraviolet stabilizer from a viewpoint of weatherability. As said ultraviolet absorbing agent and/or ultraviolet stabilizer, there may be employed those which are recited in the above explanation of water-based ink composition. These ultraviolet absorbing agent and/or ultraviolet stabilizer are blended in an amount of 0.1 to 5 parts by weight per 100 parts by weight of resinous solid content in paint.

The above-mentioned clear paint is applied by any known method such as air spray, air-less spray and electrostatic rotary atomizing coating method. The thickness of clear coat (ii) as dried film is usually 10 to 50 μm.

Water-based Paint Compositions

Thus prepared water-based pigment dispersion can be blended with binder resin for paint and suitably with other additives such as aqueous medium, fine polymer particles, curing catalyst, basic neutralizer, ultraviolet absorber, ultraviolet stabilizer, paint film surface regulating agent, antioxidant, flow property regulator, silane coupling agent and the like, and stably dispersed in aqueous medium to provide a water-based paint composition.

Useful paint binder resins include combination of base resins which are normally used in the field of water-soluble or water-dispersible paint, with curing agent. Examples of such base resin include hydroxyl group-containing acrylic resin, hydroxyl group-containing polyester resin, epoxy group-containing copolymer resin and carboxyl group-containing high acid value resin. As examples of useful curing agent, amino resins and optionally-blocked polyisocyanate compounds can be named, which can be used either singly or in combination.

As said hydroxyl-containing acrylic resin, copolymers having a weight-average molecular weight within a range of from about 2,000 to about 100,000, in particular, from 5,000 to 50,000, which are obtained by copolymerization of a hydroxyl group-containing polymerizable unsaturated monomer such as 2-hydroxyethyl (meth)acrylate with other polymerizable unsaturated monomer or monomers in the presence of a radical polymerization initiator are preferred.

As hydroxyl group-containing polyester resin, those having a weight-average molecular weight within a range of from about 1,000 to about 100,000, in particular, from 1,500 to 70,000, which are obtained by condensation reaction between polyhydric alcohols such as ethylene glycol, butylene glycol, 1,6-hexanediol, trimethylolpropane and pentaerythritol, and polyvalent carboxylic acids such as adipic acid, isophthalic acid, terephthalic acid, phthalic anhydride, hexahydrophthalic anhydride and trimellitic anhydride are preferred.

As amino resins and optionally-blocked polyisocyanate compounds which are used as curing agent, there may be employed those which are recited above with respect to water-based ink composition.

The aqueous medium which is used when necessity arises can be suitably selected from those useful for preparing the pigment dispersions as earlier explained.

The fine polymer particles are provided by a polymer which does not dissolve in water-based paint compositions of the present invention but disperses as fine particles. Suitable average particle size normally is within a range of 0.01-1 μm, preferably 0.05-0.8 μm. Inside of the particles may either be crosslinked or not, the former being preferred. As such fine polymer particles, those known per se as flow property regulator in the field of paint can be used.

Where an optionally-blocked polyisocyanate compound is used as the curing agent, organometal catalysts such as dibutyltin diacetate, dibutyltin dioctate, dibutyltin dilaurate and the like; and amines such as triethylamine, diethanolamine and the like can be conveniently used as the curing catalyst. When an amino resin such as melamine resin is used as the curing agent, such curing catalyst as sulfonic acid compound, e.g., paratoluenesulfonic acid, dodecylbenzensulfonic acid and dinonylnaphthalenesulfonic acid; or amine-neutralization products of these sulfonic acid compounds are conveniently used.

As examples of ultraviolet absorber, benzophenone, benzotriazole, cyanoacrylate, salicylate and oxalic acid anilide compounds may be named. As the ultraviolet stabilizer, hindered amine compounds can be used.

The water-based paint compositions according to the invention are useful as coloring paint compositions (including metallic paint and iridescent paint) into which various pigments such as coloring pigments, metallic pigments and iridescent pigments are blended. In particular, they can be conveniently used as top coating paint (coloring base coat) for automotive finish.

The paint compositions according to the invention can be applied onto various substrate, following the practice known per se, and can form cured coating film when baked normally at temperatures of from about 80° C. to about 180° C., for about 10-60 minutes. Where a short time baking is desired, for example, a cured coating film can be formed by baking under such conditions as will attain the highest temperature of from about 180° C. to about 250° C. of the material being baked, for about 20-about 60 seconds.

Substrate to be coated with the paint compositions of the present invention are subject to no specific limitation, examples of which include metallic substrate such as steel sheet, aluminum, tin and the like; other substrate such as of mortar, cement, plastics, glass and the like; and these substrates which have been subjected to surface treatment and/or coating film formation. In particular, metallic substrates and plastic substrates are suitable for use.

Examples of steel sheet include cold-rolled steel sheet, molten galvanized steel sheet, electrogalvanized steel sheet, aluminum plated steel sheet, stainless steel sheet, copper plated steel sheet, tin plated steel sheet, lead-tin alloy plated steel sheet (ternesheet); steel sheet plated with zinc alloy such as iron-zinc, aluminum-zinc, nickel-zinc alloys and the like. As surface-treated steel sheet, for example, steel sheet which is given a chemical treatment such as phosphate treatment, chromate treatment and the like may be named.

As the substrate on which coating film has been formed, a substrate which has been optionally surface treated and thereafter primer-coated, or said substrate which is further coated with an inter-coat can be used.

When a paint composition according to the present invention is used for automotive finish, typical substrates include: a chemically treated steel sheet which is further electro-deposition-coated with primer and optionally coated with an inter coat thereon; various plastic substrates (which have been optionally surface treated, primer-coated or further coated with an inter coat); and composite members which are combination of the foregoing.

The electrodepositing paint for electrodeposition coating may be anionic or cationic, cationic type being preferred because of good corrosion resistance. As cationic electrodeposition paint, any of those known per se can be used. For example, those containing as the resin component a base resin having hydroxyl groups and cationic groups and as the curing agent a blocked polyisocyanate compound can be conveniently used.

The water-based paint compositions according to the present invention are conveniently used for colored coating film-forming compositions for 1-coat-1-bake finish of substrates, and for top coating colored base paint compositions in 2-coat-1-bake (2C1B), 2-coat-2-bake (2C2B), 3-coat-1-bake (3C1B), 3-coat-2-bake (3C2B), or 3-coat-3-bake (3C3B) systems.

Where the paint compositions according to the present invention are used for colored top coating for automobiles, the top coat can be formed through the steps of, applying the paint composition onto a primer film such as an electrodeposited coating film or onto an uncured or cured inter coat applied onto such a primer film, by such means as electrostatic atomizing coating (bell-type or the like) or aerosol coating, to a dry film thickness of normally from about 10 to about 60 μm; and allowing it to stand for several minutes at room temperature, or forcedly drying the film for several minutes at temperatures ranging from about 50 to about 80° C.; thereafter applying a clear top coat paint thereon; and baking the same at temperatures of from about 120 to about 180° C. normally for about 10-about 60 minutes. It is also possible to apply a clear top coating paint onto the uncured or cured colored top coat film, by such means as electrostatic atomizing coating (bell-type or the like) or aerosol coating, to a dry film thickness of normally from about 20 to about 100 μm followed by curing, to form multi-layered top coating film.

As such clear top coating paint to be applied onto the above-described colored top coat, those conveniently used are clear top coating paints comprising at least one base resin having a crosslinkable functional group (e.g., hydroxyl, epoxy, carboxyl, alkoxysilane group and the like) such as acrylic, vinyl, polyester, alkyd and urethane resins; and at least one crosslinking agent for crosslinking and curing the base resin, such as alkyletherified melamine resin, urea resin, guanamine resin, optionally-blocked polyisocyanate compound, epoxy resin and carboxyl-containing compound. In such clear top coating paint, convenient blend ratio of the base resin and the crosslinking agent is, based on the sum of the two components, normally 50-90% by weight of the base resin component and 10-50% by weight of the cross-linking agent component. The form of such clear top coating paint is subject to no specific limitation, and it can take any desired form such as organic solvent type, non-aqueous liquid dispersion type, aqueous solution type, aqueous dispersion (slurry) type, high solid type or powder type.

Hereinafter the invention is explained in further details, referring to production examples, working examples and comparative examples, in which parts and percentages are by weight unless otherwise specified.

Preparation of Pigment Dispersing Resins (I)

EXAMPLE 1

An ordinary reaction vessel for producing acrylic resins, equipped with a stirrer, thermometer and a reflux condenser was charged with 38 parts of ethylene glycol monobutyl ether and 12 parts of isobutyl alcohol. The content in the vessel was heated under stirring, and maintained at 110° C. Into the system, a mixture of 48.5 parts of methyl methacrylate, 20 parts of n-butyl acrylate, 5 parts of 2-(methacryloyloxy)ethyltrimethyl ammoniumchloride, 1.5 parts of 2-(2'-hydroxy-5'-methacryloyloxyethylphenyl)-2H-benzotriazole, 5 parts of 2-hydroxyethyl acrylate, 40 parts of NF BISOMER™ S20W (trademark of 50% water-dilute of methoxy polyethylene glycol monomethacrylate having a molecular weight of about 2080 manufactured by Dai-ich Kogyo Seiyaku Co., Ltd.,), 1 part of azobisisobutyronitrile and 20 parts of isobutyl alcohol was added dropwise over a period of 3 hours, followed by 30 minutes' aging at 110° C. Then an additional catalytic liquid mixture of 10 parts of ethylene glycol monobutyl ether and 0.5 part of azobisisobutyronitrile was added dropwise over a period of 1 hour, followed by an hour's aging at 110° C. and cooling. Thus a pigment dispersing resin (I-1) solution having a solid content of 50% was obtained.

EXAMPLES 2-5 AND COMPARATIVE EXAMPLE 1

Example 1 was repeated except that the formulation of the used components was varied for each run as shown in the following Table 1, to provide solutions of pigment dispersing resins (I-2) to (I-6). The solid contents of these solutions, and resin acid values of these resins were as shown in the same Table 1. In Table 1, the amount of NF BISOMER™ S20W means solid content.

TABLE 1

|  |  | Examples | | | | | Comparative Example |
|---|---|---|---|---|---|---|---|
|  |  | 1 | 2 | 3 | 4 | 5 | 1 |
| Pigment dispersing resin |  | I-1 | I-2 | I-3 | I-4 | I-5 | I-6 |
| Monomeric composition | Methyl methacrylate | 48.5 | 48 | 28 | 47.5 |  | 55 |
|  | n-Butyl acrylate | 20 | 20 |  | 20 | 20 | 20 |
|  | n-Butyl methacrylate |  |  | 20 |  |  |  |
|  | 2-(Methacryloyloxy)ethyl trimethyl ammonium chloride | 5 |  |  | 5 | 5 |  |
|  | 2-Acrylamide-2-methylsulfonic acid |  | 5 |  |  |  |  |
|  | N,N-dimethyl-aminoethyl methacrylate |  |  | 30 |  |  |  |
|  | 2-(2'-Hydroxy-5'-methacryloyl-oxyethylphenyl)-2H-benzotriazole | 1.5 | 2 | 2 | 2 |  |  |
|  | 4-Methacryloyloxy-1,2,2,6,6-pentamethyle-piperidine |  |  |  |  | 0.5 | 1.5 |
|  | NF BISOMER™ S20W | 20 | 20 | 20 | 20 | 20 | 20 |
|  | 2-Hydroxyethyl acrylate | 5 | 5 |  | 5 | 5 | 5 |
| Hydroxyl value (mgKOH/g) |  | 24 | 24 | — | 24 | 24 | 24 |
| Weight average molecular weight |  | 35000 | 35000 | 20000 | 35000 | 35000 | 35000 |
| Acid value (mgKOH/g) |  | — | 38 | — | — | — | — |

Synthesis of Pigment Dispersing Resin (II)

SYNTHESIS EXAMPLE 1

A reaction vessel for producing acrylic resins, equipped with a stirrer, thermometer and a reflux condenser was charged with 40 parts of ethylene glycol monobutyl ether and 30 parts of isobutyl alcohol, which were heated under stirring. When the temperature of the system reached 100° C., a mixture of the following monomers was added to the system dropwise, consuming 3 hours:

|  | part |
|---|---|
| Methyl methacrylate | 34 |
| n-Butyl acrylate | 30 |
| 2-Ethylhexylmethacrylate | 20 |
| 2-Hydroxyethyl acrylate | 10 |
| Acrylic acid | 6 |
| 2,2'-Azobisisobutyronitrile | 1 |
| Isobutyl alcohol | 10 |

After the dropwise addition was completed, the system was maintained at 100° C. for further 30 minutes, and thereafter an additional catalytic solution which was a mixture of 0.5 part of 2,2'-azobisisobutyronitrile and 10 parts of ethylene glycol monobutyl ether was added dropwise, consuming an hour, followed by further an hour's stirring at 100° C. and cooling. Thus an acrylic resin solution (II-1) having a solid concentration of 50% was obtained. The obtained resin had an acid value of 47 mgKOH/g, a hydroxyl value of 48 mgKOH/g and a weight average molecular weight of 40,000.

SYNTHESIS EXAMPLE 2

A reaction vessel equipped with a stirrer, thermometer, rectification column and nitrogen inlet pipe was charged with 317.8 parts of isophthalic acid, 196.5 parts of hexahydrophthalic acid, 372.6 parts of adipic acid, 268 parts of neopentyl glycol, 217.8 parts of 1,6-hexanediol and 263.5 parts of trimethylolpropane, which were heated under stirring while nitrogen gas was introduced. After the temperature reached 160° C., the system was gradually heated to 235° C. over a period of 3 hours, followed by 1.5 hours' aging. Thereafter the rectification column was switched to reflux condenser, and the reaction was conducted after introduction of 100 parts of toluene, under reflux. The reaction was continued for 6 hours at 235° C., and thereafter the toluene was removed under reduced pressure. The system was cooled to 170° C., followed by addition of 122.5 parts of trimellitic anhydride and 30 minutes' aging at 170° C. Further 322 parts of butyl cellosolve was added and the system was thereafter cooled to 80° C., 4 parts of N,N-dimethylaminoethanol was added, and the system was allowed to stand at 80° C. for 30 minutes, followed by cooling to 50° C., addition of 2600 parts of deionized water and 30 minutes' stirring. Thus a polyester resin (II-2) solution having a solid concentration of 50% was obtained. The obtained resin had an acid value of 56 mgKOH/g, a hydroxyl value of 90 mgKOH/g and a weight average molecular weight of 25,000.

Synthesis of Acrylic Emulsion

A reaction vessel for producing acrylic resins, equipped with a stirrer, thermometer and a reflux condenser was charged with 400 parts of deionized water and 2.4 parts of Newcol™ 562SF (Nippon Nyukazai Co., Ltd., a surfactant), which were heated under stirring. When the temperature reached 82° C., a pre-emulsion forming mixture was charged, which had been prepared by mixing 6 parts of styrene, 8.5 parts of n-butyl acrylate, 0.5 part of allyl methacrylate, 0.175 part of Newcol™ 562SF and 7.5 parts of deionized water and stirring the mixture with disper at about 1000 r.p.m. for 10 minutes. Twenty (20) minutes after charging said pre-emulsion forming mixture, 15 parts of deionized water and 0.54 part of potassium persulfate were added. After further 10 minutes, while the system was still maintained at 82° C., a first monomeric mixture formed by mixing 114 parts of styrene, 161.5 parts of n-butyl acrylate, 9.5 parts of allyl methacrylate, 3.325 parts of Newcol™ 562SF and 142.5 parts of deionized water, stirring the mixture with a disper at about 1,000 r.p.m. for 10 minutes and adding thereto 15 parts of deionized water and 0.54 part of potassium persulfate, was added dropwise over a period of 3 hours. Then after intervening standing at 82° C. for 30 minutes, a second monomeric mixture formed by mixing 50 parts of styrene, 23 parts of n-butyl acrylate, 10 parts of 2-hydroxyethyl acrylate, 5 parts of methacrylic acid, 1.6 parts of Newcol™ 562SF and 60 parts of deionized water, stirring the mixture with a disper at about 1,000 r.p.m. for 10 minutes and adding thereto 15 parts of deionized water and 0.54 part of potassium persulfate, was added dropwise over a period of 1.5 hours. After the addition, the system was maintained at 82° C. for 30 minutes, cooled, and when the temperature dropped to 75° C., a mixture of 7 parts of N,N-dimethylamionoethanol and 280 parts of deionized water was added dropwise over 15 minutes, followed by 15 minutes' standing at 75° C. Upon further cooling, an acrylic emulsion having a solid concentration of 30% was synthesized.

Preparation of Water-based Pigment Dispersions

EXAMPLES 6 TO 12 AND COMPARATIVE EXAMPLES 2 AND 3

A wide-mouthed glass bottle of 225 cc in capacity was fed with those pigment dispersing resin solutions which had been synthesized in the above Examples 1 to 5 and Comparative Example 1, pigment, BYK-028 (trademark of antifoaming agent manufactured by BYK-Chemie Co.) and deionized water at the compositional formulation as shown by Table 2 below, and was further fed with glass beads of about 1.3 mm in diameter as a dispersing medium. The bottle was sealed and the content was dispersed with a paint shaker for 4 hours, and, thus, water-based pigment dispersions ① to ⑨ were prepared.

The following is a note for Table 2.

b: HP Design Jet Pigment Ink System UV Magenta CI 894A, magenta ink for ink-jet manufactured by Hewlett-Packard Co.

(Performance Test Method)

State of Paste

The state of each water-based ink in glass container was visually observed according to the following criteria.

O: Uniform, and no precipitate is observed.

Δ: A small amount of precipitate is observed.

X: A considerable amount of precipitate is observed.

Light Transmission:

Each water-based ink was applied onto PET film with a doctor blade so that coating-film thickness might be 50 μm. The percent transmission of dried coating film was measured with a turbidimeter (COH-300) following the equation below to evaluate transparency:

$$\text{Light transmission (\%)} = 100 \times \left(1 - \frac{\text{scattered light intensity}}{\text{radiated light intensity}}\right)$$

Hue-coloring Power

Each water-based ink was applied onto black and white PET films with a doctor blade so that coating film thickness might be 50 μm. L*, a* and b* of dried coating film was measured with a spectrocolorimeter (made by BYK-Chemie Co.), and, thus, hue and coloring power were evaluated. It

TABLE 2

|  |  |  | Examples |  |  |  |  |  | Comparative Examples |  |
|---|---|---|---|---|---|---|---|---|---|---|
|  |  | 6 | 7 | 8 | 9 | 10 | 11 | 12 | 2 | 3 |
| Water-based pigment dispersions |  | ① | ② | ③ | ④ | ⑤ | ⑥ | ⑦ | ⑧ | ⑨ |
| Pigment dispersing resin solution | Species | I-1 | I-2 | I-2 | I-2 | I-3 | I-4 | I-5 | I-6 | I-6 |
|  | Amount | 5 | 5 | 5 | 5 | 5 | 5 | 5 | 5 | 5 |
| Pigment | Pigment Blue 15:3 | 5 |  |  |  |  | 5 | 5 | 5 |  |
|  | Pigment Red 122 |  | 5 |  |  |  |  |  |  |  |
|  | RT-355D (NOTE 1) |  |  | 5 |  |  |  |  |  | 5 |
|  | Pigment Yellow 74 |  |  |  | 5 |  |  |  |  |  |
|  | Pigment Black 7 |  |  |  |  | 5 |  |  |  |  |
| BYK-028 |  | 0.6 | 0.6 | 0.6 | 0.6 | 0.6 | 0.6 | 0.6 | 0.6 | 0.6 |
| Deionized water |  | 47.9 | 47.9 | 47.9 | 47.9 | 47.9 | 47.9 | 47.9 | 47.9 | 47.9 |

(NOTE 1) RT 355D: an organic red pigment manufactured by Ciba Specialty Chemicals, Inc., under tradename of Cinquasia Magenta RT 355D Preparation of Water-based Ink Water-based pigment dispersions which had been obtained in the above Examples 6 and 7 and Comparative Examples 2 and 3 were used as they were for water-based ink, and were subjected to performance test by the following test method. Results are shown in Table 3 which is mentioned later Besides, ink-jet pigment ink a and b on the market were also subjected to performance test as Comparative Examples 4 and 5 respectively, by the following test method. Results are shown in Table 3 which is mentioned later. Pigment ink a and b on the market which are shown in Table 3 are as follows.

a: HP Design Jet Pigment Ink System UV Cyan CI 893A, cyan ink for ink-jet manufactured by Hewlett-Packard Co.

was known from the results of L*, a* and b* that Examples showed strong coloring power and improved chroma.

TABLE 3

|  |  | Examples |  | Comparative Examples |  |  |  |
|---|---|---|---|---|---|---|---|
|  |  | 6 | 7 | 2 | 3 | 4 | 5 |
| Water-based ink |  | ① | ② | ⑧ | ⑨ | a | b |
| Performance test | State | O | O | Δ | Δ | O | O |
|  | Light transmission (%) | 91.7 | 92.2 | 79.5 | 71 | 88.6 | 89.3 |

TABLE 3-continued

|  | Examples | | Comparative Examples | | | |
|---|---|---|---|---|---|---|
|  | 6 | 7 | 2 | 3 | 4 | 5 |
| L* | 26.1 | 31.2 | 45.2 | 33.5 | 42.1 | 33.5 |
| a* | 2.7 | 70.2 | −35.6 | 67 | −36.3 | 67.4 |
| b* | −53 | −2.6 | −45.2 | 0.4 | −40.9 | 7.5 |

NOTE:
L*, a* and b* were measured on a white ground.

EXAMPLES 13 TO 19 AND COMPARATIVE EXAMPLES 6 TO 13

A container was charged with 50 parts of the acrylic resin (II-1) solution formed in Synthesis Example 1, 42.8 parts of the polyester resin (II-2) solution formed in Synthesis Example 2, 66.6 parts of the acrylic emulsion formed in Synthesis Example 3, 50 parts of Cymel™ 325 (trademark of a methyl etherified melamine resin solution having a solid content of about 80% manufactured by Mitsui Cytec Co., Ltd.), 1 part of 28% water-dilution of Primal™ ASE-60 (trademark of a thickener manufactured by Japan Acryl Chemicals Co., Ltd.), 0.8 part of dimethyl ethanolamine, 167 parts of deionized water and 21.8 parts of 2-ethylhexyl alcohol, which were stirred with a disper to give a mixed resin solution having a solid content of 25%.

The water-based pigment dispersions which had been obtained in the above Examples 6 to 12 and the mixed resin solution which had been prepared in the above-mentioned manner were fed, according to the compositional formulation as shown in Table 4 which is mentioned later, in a container, and were stirred with a disper to give water-based ink.

On the other hand, ink-jet pigment ink a to h on the market and the mixed resin solution which had been prepared in the above-mentioned manner were fed, according to the compositional formulation as shown in Table 5 which is mentioned later, in a container, and were stirred with a disper to give water-based ink for comparison. Pigment ink c to h on the market which are shown in Table 5 are as follows:

c: HP Design Jet Pigment Ink System UV Yellow CI 895A, yellow ink for ink-jet manufactured by Hewlett-Packard Co.

d: HP Design Jet Pigment Ink System UV Black CI 892A, black ink for ink-jet manufactured by Hewlett-Packard Co.

e: μ-Crysta MC5CL01 Cyan Color, ink-jet ink manufactured by Epson Co.

f: μ-Crysta MC5CL01 Magenta Color, ink-jet ink manufactured by Epson Co.

g: μ-Crysta MC5CL01 Yellow Color, ink-jet ink manufactured by Epson Co.

h: μ-Crysta MC5CL01 Black Color, ink-jet ink manufactured by Epson Co.

Water-based ink which had been obtained as mentioned above were subjected to performance test by the following method. Results are shown in Tables 4 and 5.

(Method of Performance Test)

A 0.8 mm-thick cold rolled dull steel sheet which had been chemically treated with zinc phosphate was coated with an epoxy resin-based cationic electrodeposition paint to a dry film thickness of about 20 μm which was subsequently baked. Onto this electrodeposited paint film, automotive polyester resin-based inter coating paint was applied to a dry film thickness of about 20 μm and baked. This coated steel sheet was wet-sanded with #400 sand paper, dried off and degreased with petroleum benzine. Onto so degreased coat surface, each of the water-based ink was applied with minibell rotation type electrostatic coater at a booth humidity of 70%, to a dry film thickness of about 15 μm. Each of the paint film was baked with an electric hot air dryer at 140° C. for 30 minutes to provide test panel.

Thus prepared test panels were subjected to a test with xenon weatherometer for 600 hours. Then, ΔE of thus tested panels was measured by Color View Spectrocolorimeter (made by BYK-Chemie Co.), and weatherability was evaluated. The smaller the value of ΔE is, the better is weatherability.

TABLE 4

|  |  | Examples | | | | | | |
|---|---|---|---|---|---|---|---|---|
|  |  | 13 | 14 | 15 | 16 | 17 | 18 | 19 |
| Water-based pigment dispersions | Species Amount | ① 58.5 | ② 58.5 | ③ 58.5 | ④ 58.5 | ⑤ 58.5 | ⑥ 58.5 | ⑦ 58.5 |
| Mixed resin solution |  | 352.2 | 352.2 | 352.2 | 352.2 | 352.2 | 352.2 | 352.2 |
| ΔE |  | 0.43 | 1.97 | 3.13 | 12.7 | 0.88 | 0.38 | 0.51 |

TABLE 5

|  |  | Comparative Examples | | | | | | | |
|---|---|---|---|---|---|---|---|---|---|
|  |  | 6 | 7 | 8 | 9 | 10 | 11 | 12 | 13 |
| Water-based ink on the market | Species Amount | a 58.5 | b 58.5 | c 58.5 | d 58.5 | e 58.5 | f 58.5 | g 58.5 | h 58.5 |
| Mixed resin solution |  | 352.2 | 352.2 | 352.2 | 352.2 | 352.2 | 352.2 | 352.2 | 352.2 |
| ΔE |  | 1.72 | 5.04 | 18.75 | 0.98 | 0.55 | 5.17 | 14.34 | 5.17 |

Preparation of Water-based Ink

EXAMPLES 20 TO 22

A wide-mouthed glass bottle of 225 cc in capacity was fed with those pigment dispersing resin solutions (I-1) and (I-2) each having a solid content of 50% which had been prepared in the above Examples 1 and 2, pigment, BYK-028 (trademark of silicone-based anti-foaming agent manufactured by BYK-Chemie Co.), isopropanol, glycerin and deionized water at the compositional formulation as shown by Table 6 below, and was further fed with glass beads of about 1.3 mm in diameter as a dispersing medium. The bottle was sealed and the content was dispersed with a paint shaker for 4 hours. and, thus, water-based pigment dispersions were prepared.

Thus prepared water-based pigment dispersions and the mixed resin solutions which had been obtained in the above Examples 13 to 19 were fed, at a compositional formulation as shown in Table 6, in a container, and were stirred with a disper to give water-based ink.

TABLE 6

|  |  |  | Examples | | |
|---|---|---|---|---|---|
|  |  |  | 20 | 21 | 22 |
| Water-based pigment dispersion | Pigment dispersing resin solution | Species Amount | I-2 5 | I-2 5 | I-1 5 |
|  | RT355D |  | 5 |  | 5 |
|  | Pigment Yellow 74 |  |  | 5 |  |
|  | BYK-028 |  | 0.6 | 0.6 | 0.6 |
|  | Isopropanol |  | 10 | 10 | 10 |
|  | Glycerin |  | 7.5 | 7.5 | 7.5 |
|  | Deionized water |  | 47.9 | 47.9 | 47.9 |
| Mixed resin solution |  |  | 750 | 900 | 750 |

COMPARATIVE EXAMPLES 14 TO 17

Ink-jet pigment ink b, c, f and g and the mixed resin solutions which had been obtained in the above Examples 13 to 19 were fed, at a compositional formulation as shown in Table 7, in a container, and were stirred with a disper to give water-based ink for comparison.

TABLE 7

|  |  | Comparative Examples | | | |
|---|---|---|---|---|---|
|  |  | 14 | 15 | 16 | 17 |
| Water-based ink on the market | Species Amount | b 58.5 | f 58.5 | c 58.5 | g 58.5 |
| Mixed resin solution |  | 750 | 750 | 750 | 750 |

Preparation of Ink-jet Print

EXAMPLES 23 TO 25 AND COMPARATIVE EXAMPLES 18 TO 21

Printed layer was formed by printing on a polyester film by using ink-jet drawing device BJF660V (made by Canon Corporation), in a manner as shown in Table 8 below, with use of water-based ink which had been prepared in the above Examples 20 to 22 and Comparative Examples 14 to 17. After dried at room temperature for 10 minutes, the printed layer was coated with two-pack acryl urethane organic solvent type clear paint RETAN PG2K CLEAR (made by Kansai Paint Co., Ltd.; containing ultraviolet absorber) by air spray so that dried film thickness might be 30 to 40 μm, and was then dried by electric hot air drier at 60° C. for 20 minutes to give ink-jet prints.

Thus prepared ink-jet prints were subjected to durability test, and were evaluated in the following manner. Results are shown in Table 8.

Durability Test

Ink-jet prints were dipped in deionized water at room temperature for 24 hours, and, then, the degree of blur was visually evaluated. O means a good state without blur, and X means the state where printed images were broken by blur.

TABLE 8

|  | Examples | | | Comparative Examples | | | |
|---|---|---|---|---|---|---|---|
|  | 23 | 24 | 25 | 18 | 19 | 20 | 21 |
| Water-based ink | E. 20 | E. 21 | E. 22 | CE. 14 | CE. 15 | CE. 16 | CE. 17 |
| Durability | O | O | O | X | X | X | X |

NOTE
E.: Example
CE.: Comparative Example

EXAMPLES 26 TO 31 AND COMPARATIVE EXAMPLES 22 TO 25

A 0.8 mm-thick cold rolled dull steel sheet which had been chemically treated with zinc phosphate was coated with an epoxy resin-based cationic electrodeposition paint to a dry film thickness of about 20 μm which was subsequently baked. Onto this electrodeposited paint film, automotive polyester resin-based inter coating paint was applied to a dry film thickness of about 20 μm and baked. This coated steel sheet was wet-sanded with #400 sand paper, dried off and degreased with petroleum benzine. Onto so degreased coat surface, each of the water-based ink which had been obtained in Examples 20 to 22 and Comparative Examples 14 to 17 was applied for printing with ink-jet type automatic painter Michelangelo V7 (made by LAC Co.) in a manner as shown in Table 9 below, at a booth humidity of 70%. Thus printed coat was left to dry at room temperature for five minutes, and was then baked with an electric hot air dryer at 80° C. for 10 minutes to form printed layer. Almost all of volatile components were thus allowed to volatilize, and, thereafter, the printed layer was left to cool in room. Then, the printed layer was coated with clear paint (II-1) to (II-4) by air spray in a manner as shown in Table 9 so that dried film thickness might be 40 μm, and, subsequently, thus coated printed layer was baked by electric hot air drier for 30 minutes either at 140° C. or at 80° C. depending on used paint, and, thus, ink-jet prints were obtained.

The prepared prints were subjected to a test with xenon weatherometer for 600 hours and 2,000 hours. Then, ΔE of thus tested prints was measured by Color View Spectrocolorimeter (made by BYK-Chemie Co.), and weatherability was evaluated. Results are shown in Table 9 below. The smaller the value of ΔE is, the better is weatherability.

Clear paints which are shown in Table 9 are identified as follows:
(II-1): Acrylic resin-based organic solvent type thermosetting clear paint KINO 1200T (made by Kansai Paint Co., Ltd.; containing ultraviolet absorber)
(II-2): Acrylic resin-based organic solvent type clear paint ACRIC 2026 (made by Kansai Paint Co., Ltd.; containing ultraviolet absorber)
(II-3): Acryl melamine resin-based organic solvent type thermosetting clear paint MAGICRON TC-71 (made by Kansai Paint Co., Ltd.; containing ultraviolet absorber)
(II-4): Two-pack acryl urethane-based organic solvent type clear paint RETAN PG2K CLEAR (made by Kansai Paint Co., Ltd.; containing ultraviolet absorber)

TABLE 9

| | Examples | | | | | |
|---|---|---|---|---|---|---|
| | 26 | 27 | 28 | 29 | 30 | 31 |
| Water-based ink | Ex. 20 | Ex. 21 | Ex. 22 | Ex. 20 | Ex. 20 | Ex. 20 |
| Species of clear paint | II-1 | II-1 | II-1 | II-2 | II-3 | II-4 |
| ΔE 600 h | 0.72 | 2.35 | 2.14 | 0.92 | 0.68 | 0.75 |
| 1200 h | 2.54 | 2.76 | 3.21 | 2.97 | 2.01 | 2.38 |

| | Comparative Examples | | | |
|---|---|---|---|---|
| | 22 | 23 | 24 | 25 |
| Water-based ink | CEx. 14 | CEx. 15 | CEx. 16 | CEx. 17 |
| Species of clear paint | II-1 | II-1 | II-1 | II-1 |
| ΔE 600 h | 3.61 | 3.92 | 4.76 | 4.42 |
| 1200 h | 4.09 | 4.27 | 5.23 | 5.01 |

The use of the water-based pigment dispersing resins of this invention provides water-based pigment dispersions which excel in wetting property and dispersing stability even at high pigment concentration, and which have low viscosity and are excellent in color developing property and weatherability. The use of said water-based pigment dispersions in turn give a water-based ink composition which excels not only in pigment color-developing property and pigment dispersing stability but also in sharpness, transparency, and color developing property and weatherability. Said water-based ink composition is in particular suitable for outdoor use.

The invention claimed is:

1. Water-based pigment dispersion which comprises a pigment dispersing resin (I), pigment, aqueous medium, other pigment dispersing resin (II) and, optionally, dispersing agent, said pigment dispersing resin (I) being a copolymer of:
   (A) polymerizable unsaturated monomer containing at least one kind of ionic functional group selected from the group consisting of tertiary amino group, quaternary ammonium salt and sulfonic acid group;
   (B) nonionic polymerizable unsaturated monomer having polyoxyethylene chain;
   (C) ultraviolet-absorbing polymerizable unsaturated monomer and/or ultraviolet-stabilizing polymerizable unsaturated monomer; and
   (D) other ethylenically unsaturated monomer, said copolymer being a copolymerization product of 0.5 to 30% by weight of ionic function group-contaning polymerizable unsaturated monomer (A), 5 to 40% by weight of nonionic polymerizable unsaturated monomer (B), 0.1 to 5% by weight of ultraviolet-stabilizing polymerizable unsaturated monomer (C) and 25 to 94.4% by weight of other ethylenically unsaturated monomer (D) on the basis of the total weight of monomers (A), (B), (C) and (D),
   said other pigment dispersing resin (II) being selected from the group consisting of acrylic resin having a weight average molecular weight within a range of 2,000 to 150,000, an acid value in a range of 5 to 150 and a hydroxyl value in a range of 10 to 160, and polyester resin having a weight average molecular weight within a range of 1,000 to 100,000, an acid value in a range of 5 to 150, and a hydroxyl value in a range of 10 to 160.

2. Water-based pigment dispersion of claim 1 wherein the ionic functional group-containing polymerizable unsaturated monomer (A) is selected from the group consisting of N,N-dimethylaminoethyl (meth)acrylate, N,N-diethylaminoethyl (meth)acrylate, N,N-dimethylaminopropyl (meth)acrylate, N,N-di-t-butylaminoethyl (meth)acrylate, N,N-dimethylaminobutyl (meth)acrylate, N,N-dimethylaminoethyl (meth)acrylamide, N,N-diethylaminoethyl (meth)acrylamide and N,N-dimethylaminopropyl (meth)acrylamide, 2-(methacryloyloxy)ethyl trimethylammonium chloride, 2-(methacryloyloxy)ethyl trimethylammonium bromide, (meth)acryloylaminopropyl trimethylammonium chloride, (meth)acryloylaminopropyl trimethylammonium bromide, tetrabutylammonium(meth)acrylate, trimethylbenzylammonium (meth)acrylate, 2-(methacryloyloxy)ethyl trimethylammonium dimethyiphosphate, 2-acrylamide-2-methylpropanesulfonic acid and 2-sulfoethyl(meth)acrylate.

3. Water-based pigment dispersion of claim 1 wherein the ionic functional group-containing polymerizable unsaturated monomer (A) is selected from the group consisting of N,N-dimethylaminoethyl (meth)acrylate, N,N-diethylaminoethyl (meth)acrylate, 2-(methacryloyloxy)ethyltrimethylammonium chloride and 2-acrylamide-2-methylpropanesulfonic acid.

4. Water-based pigment dispersion of claim 1 wherein the ionic functional group-containing polymerizable unsaturated monomer (A) comprises a combination of quaternary ammonium salt-containing polymerizable unsaturated monomer and tertiary amino group-containing polymerizable unsaturated monomer.

5. Water-based pigment dispersion of claim 4 wherein the ionic functional group-containing polymerizable unsaturated monomer (A) comprises a combination of 2-(methacryloyloxy)ethyltrimethyl-ammonium chloride and either N,N-dimethylaminoethyl (meth)acrylate or N,N-diethylaminoethyl (meth)acrylate.

6. Water-based pigment dispersion of claim 1 wherein nonionic polymerizable unsaturated monomer (B) is compound of the following formula (1):

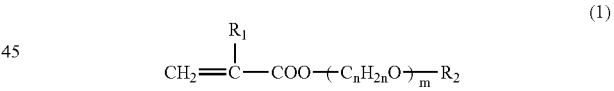

in which
R$_1$ stands for hydrogen or CH$_3$,
R$_2$ stands for hydrogen or alkyl group having one to four carbon atoms,
m is an integer of 4-60, and
n is an integer of 2 or 3,
and wherein oxyalkylene units (C$_n$H$_{2n}$O) in the number of m may be the same or different from each other.

7. Water-based pigment dispersion of claim 1 wherein nonionic polymerizable unsaturated monomer (B) is polyethylene glycol (meth)acrylate.

8. Water-based pigment dispersion of claim 1 wherein ultraviolet-absorbing polymerizable unsaturated monomer (C) is selected from the group consisting of 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloxy-2-hydroxypropoxy)benzophenone and 2-(2'-hydroxy-5'-methacryloyloxyethylphenyl)-2H-benzotriazole.

9. Water-based pigment dispersion of claim 1 wherein ultraviolet-absorbing polymerizable unsaturated monomer (C) is a polymerizable unsaturated monomer which has both (2'-hydroxyphenyl)-benzotriazole structure and (meth)acryloyl group.

10. Water-based pigment dispersion of claim 9 wherein ultraviolet-absorbing polymerizable unsaturated monomer (C) is 2'-hydroxy-5'-methacryloyloxyethy1phenyl)-2H-benzotriazole.

11. Water-based pigment dispersion of claim 1 wherein ultraviolet-stabilizing polymerizable unsaturated monomer (C) is selected from the group consisting of 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)-acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine and 1-crotonoyl-4-crotonoyloxy-2,2,6,6-tetramethylpiperidine.

12. Water-based pigment dispersion of claim 11 wherein ultraviolet-stabilizing polymerizable unsaturated monomer (C) is 4-(meth)acryloyloxy-1,2,2,6,6-pentamethylpiperidine.

13. Water-based pigment dispersion of claim 1 wherein other ethylenically unsaturated monomer (D) contains a hydroxyl group-containing polymerizable unsaturated monomer at least as a part of its component.

14. Water-based pigment dispersion of claim 1 wherein other ethylenically unsaturated monomer (D) contains a carboxyl group-containing polymerizable unsaturated monomer at least as a part of its component.

15. Water-based pigment dispersion of claim 1 wherein the copolymer has a weight average molecular weight within a range of 500 to 100,000.

16. Water-based pigment dispersion of claim 1 wherein the pigment is within a range of 10-3,000 parts by weight per 100 parts by weight of the pigment dispersing resin (I).

17. Water-based pigment dispersion of claim 1 wherein the aqueous medium is within a range of 50-5,000 parts by weight per 100 parts by weight of the pigment dispersing resin (I).

18. A water-based paint composition which comprises the water-based pigment dispersion of claim 1.

19. A water-based paint composition of claim 18 which further comprises a base resin selected from the group consisting of hydroxyl group-containing acrylic resins, hydroxyl group-containing polyester resins, epoxy group-containing copolymer resins and carboxyl group-containing high acid value resins, and a curing agent selected from the group consisting of amino resins and optionally-blocked polyisocyanate compounds.

20. An article which has been coated with the water-based paint composition of claim 18.

21. Water-based pigment dispersion of claim 1 wherein the other pigment dispersing resin (II) is within a range of 5-300 parts by weight per 100 parts by weight of the pigment dispersing resin (I).

\* \* \* \* \*